(12) United States Patent
Chandrasekhar et al.

(10) Patent No.: US 7,890,677 B2
(45) Date of Patent: Feb. 15, 2011

(54) CHASSIS MANAGEMENT ACCESS CONSOLE VIA A LOCAL KVM DISPLAY

(75) Inventors: Babu K. Chandrasekhar, Round Rock, TX (US); Alan J. Brumley, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 278 days.

(21) Appl. No.: 11/531,363

(22) Filed: Sep. 13, 2006

(65) Prior Publication Data

US 2008/0126627 A1 May 29, 2008

(51) Int. Cl.
*G06F 13/38* (2006.01)

(52) U.S. Cl. .................... 710/62; 709/203; 709/223

(58) Field of Classification Search .............. None
See application file for complete search history.

(56) References Cited

U.S. PATENT DOCUMENTS

| | | | | |
|---|---|---|---|---|
| 5,808,863 A | | 9/1998 | Radloff et al. ............ 361/683 |
| 5,857,074 A | * | 1/1999 | Johnson .................... 709/217 |
| 6,762,932 B2 | | 7/2004 | Regimbal et al. .......... 361/683 |
| 6,915,362 B2 | * | 7/2005 | Ramsey et al. ............. 710/62 |
| 6,931,458 B2 | * | 8/2005 | Bolian et al. ............... 710/15 |
| 6,976,112 B2 | * | 12/2005 | Franke et al. .............. 710/302 |
| 7,035,955 B2 | | 4/2006 | Bobbitt et al. ............. 710/305 |
| 7,093,048 B2 | | 8/2006 | Bobbitt et al. ............. 710/302 |
| 2005/0289403 A1 | * | 12/2005 | Rothman et al. ............. 714/56 |
| 2006/0031521 A1 | * | 2/2006 | Wilk .......................... 709/227 |
| 2006/0095595 A1 | * | 5/2006 | Dalton et al. ................ 710/5 |
| 2007/0220301 A1 | * | 9/2007 | Brundridge et al. ........... 714/4 |
| 2008/0034239 A1 | * | 2/2008 | Lambert et al. ............ 713/323 |
| 2008/0201501 A1 | * | 8/2008 | Partani et al. ............... 710/60 |

* cited by examiner

*Primary Examiner*—Henry W Tsai
*Assistant Examiner*—Michael Sun
(74) *Attorney, Agent, or Firm*—Hamilton & Terrile, LLP; Stephen A. Terrile

(57) ABSTRACT

A local KVM module with an on-screen display interface in which a chassis management controller is included within a list of servers which may be accessed by the local KVM module. The local KVM module includes keyboard, mouse and video connectors as well as a tiering network connector. When accessing the local KVM module, the CMC is presented as any other blade server, but with the name Chassis Management Controller (CMC). When a user selects the CMC module from the onscreen display, the user is presented with a text console, where the user can login to a text terminal interface of the CMC module. The text interface can be implemented as for example, a serial connection via a local area network (LAN) or through a tiny telnet client via a chassis private network.

12 Claims, 6 Drawing Sheets

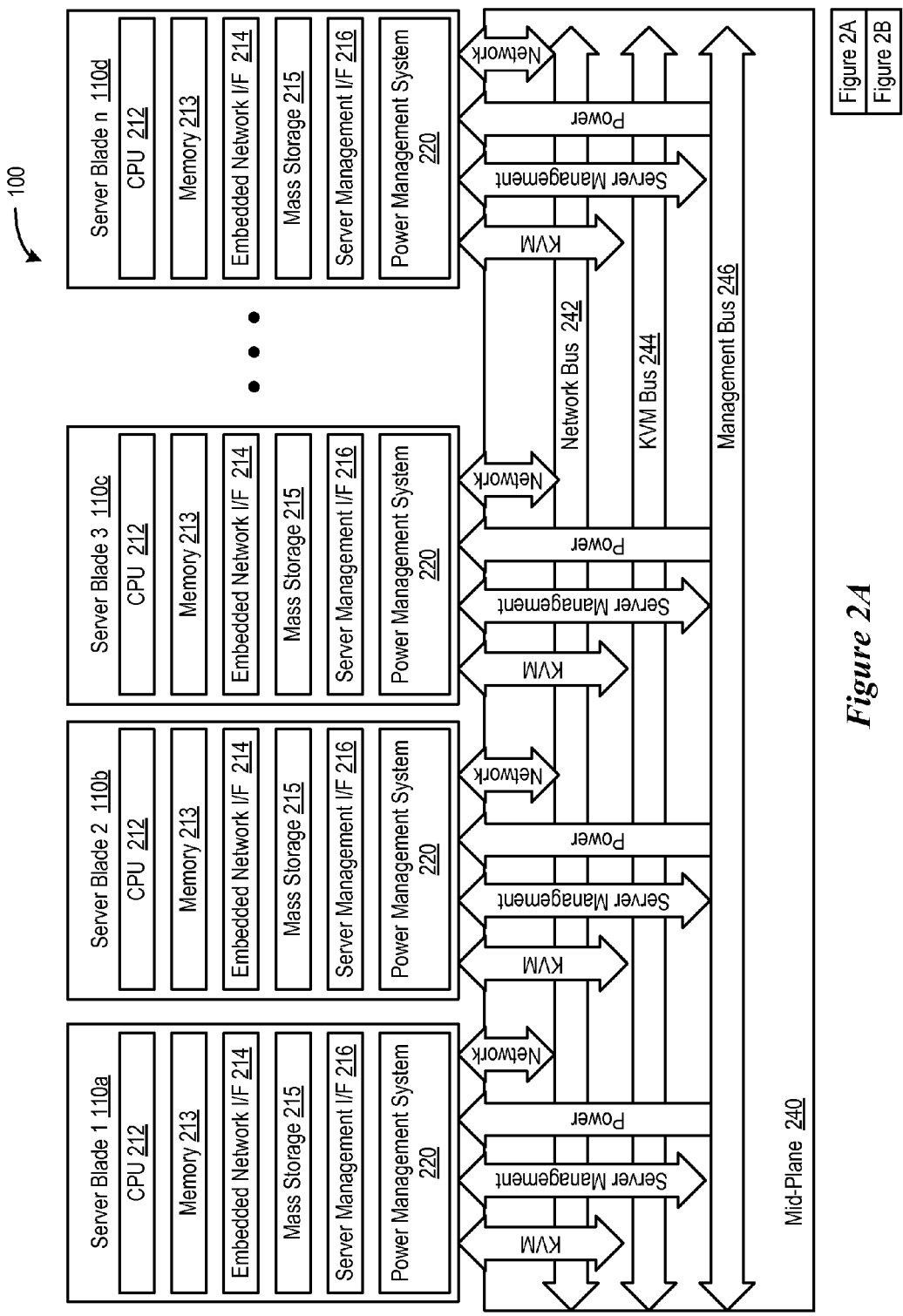

```
rac- login: root
Password:

Dell Remote Access Controller (DRAC)
Firmware Version 1.0 (Build 06.04.13)

$ getssinfo
-sh: getssinfo: not found
$ racadm getsysinfo

RAC Information:
RAC Date/Time              = Tue May 2 17:38:45 2006
Firmware Version           = 1.0
Firmware Build             = 06.04.13
Last Firmware Update       = Tue May 2 17:19:55 2006
Hardware Version           = X33
Current IP Address         = 192.168.0.120
Current IP Gateway         = 192.16
Current IP Netmask         = 255.255.255.0
DHCP Enabled               = 0
MAC Address                = 00:13:72:56:51:92
Current DNS Server 1       = 0.0.0.0
Current DNS Server 2       = 0.0.0.0
DNS Servers from DHCP      = 0
Register DNS RAC Name      = 0
```

*Figure 5*

CHASSIS MANAGEMENT ACCESS CONSOLE VIA A LOCAL KVM DISPLAY

BACKGROUND OF THE INVENTION

1. Field of the Invention

The present invention relates to providing a KVM display for a chassis management console (CMC) on a local keyboard, video, mouse (LKVM) module.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One example of an information handling system is a server system. It is known to arrange and couple a plurality of servers in a rack mounted or blade configuration. In a blade configuration, multiple server modules may be contained within a blade chassis. Each blade server can be an individual component that may or may not include internal disk storage. In systems where the blade servers do not include internal disk storage, the blade servers are often coupled to large scale dedicated storage devices that are also connected to the server system. Often multiple server modules are coupled to a single or small number of keyboard, video, mouse (KVM) controllers, which may be accessed remotely.

When a user accesses a blade server via remote KVM, the user has the option to blank and block local video output. If a local user needs access to a blade for which the local video output has been disabled (such as for a graceful shutdown of the blade, to reconfigure the blade, etc.) it is difficult to remove the other user from the remote KVM session without connecting to a chassis management controller (CMC) or integrated management controller (IMC) over an out of band access. Thus, the user who wishes to access the blade may require another computer with serial port to connect and terminate the session.

Certain CMC's do not include connections for I/O devices such as keyboard, video device or mouse. With this type of CMC, it is known to use an external information handling system with virtual terminal software such as, e.g., a HyperTerminal, to view and configure settings. A virtual terminal such a HyperTerminal, is a communications program that is designed to emulate various types of terminals. The virtual terminal can be configured to make a connection directly over a serial port of the external information handling system or over a network using a Telnet client.

In certain blade configurations, the only keyboard connector for the entire chassis is contained within a local KVM (LKVM) module, which services the server blades. In this type of blade configuration, it is often not possible to provide keyboard input to a CMC and other IO modules which have only network or serial access to the blade chassis. Additionally, if the CMC or IMCs are using dynamic host configuration protocol (DHCP) assigned Internet protocol (IP) addresses, it is often necessary to have serial access to the CMC to discover a newly assigned IP address. Due to the dynamic nature of the DHCP, it is often not possible to locate the CMC or I/O modules.

Accordingly, it would be desirable to provide a LKVM module which allows keyboard input to a CMC, which in turn would allow the CMC to be redirected to IO modules. It would also be desirable to provide such a LKVM module in an environment when addresses to the I/O modules are assigned using a DHCP.

SUMMARY OF THE INVENTION

In accordance with the present invention, a local KVM module is provided with an on-screen display interface in which a chassis management controller is included within a list of servers which may be accessed by the local KVM module. The local KVM module includes keyboard, mouse and video connectors as well as a tiering network connector. When accessing the local KVM module, the CMC is presented as any other blade server, but with the name Chassis Management Controller. When a user selects the CMC module from the onscreen display, the user is presented with a text console, where the user can login to a text terminal interface of the CMC module. The text interface can be implemented as for example, a serial connection via a local area network (LAN) or through a tiny telnet client via a chassis private network.

More specifically, in one embodiment, the invention relates to a system for controlling keyboard video monitor (KVM) functions within a server blade architecture. The system includes a server blade; a management module coupled to the server blade; and, a local KVM module coupled to the management console, the local KVM module enabling establishment of a virtual terminal with the management module.

In another embodiment, the invention relates to a server blade system. The server blade system includes a server blade chassis, a server blade coupled to the server blade chassis; a management module coupled to the server blade chassis; and, a local KVM module coupled to the management console, the local KVM module enabling establishment of a virtual terminal with the management module.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 2A and 2B show a schematic block diagram of a server blade system.

FIG. 5 shows an example presentation of a terminal display.

DETAILED DESCRIPTION

Figure 1:
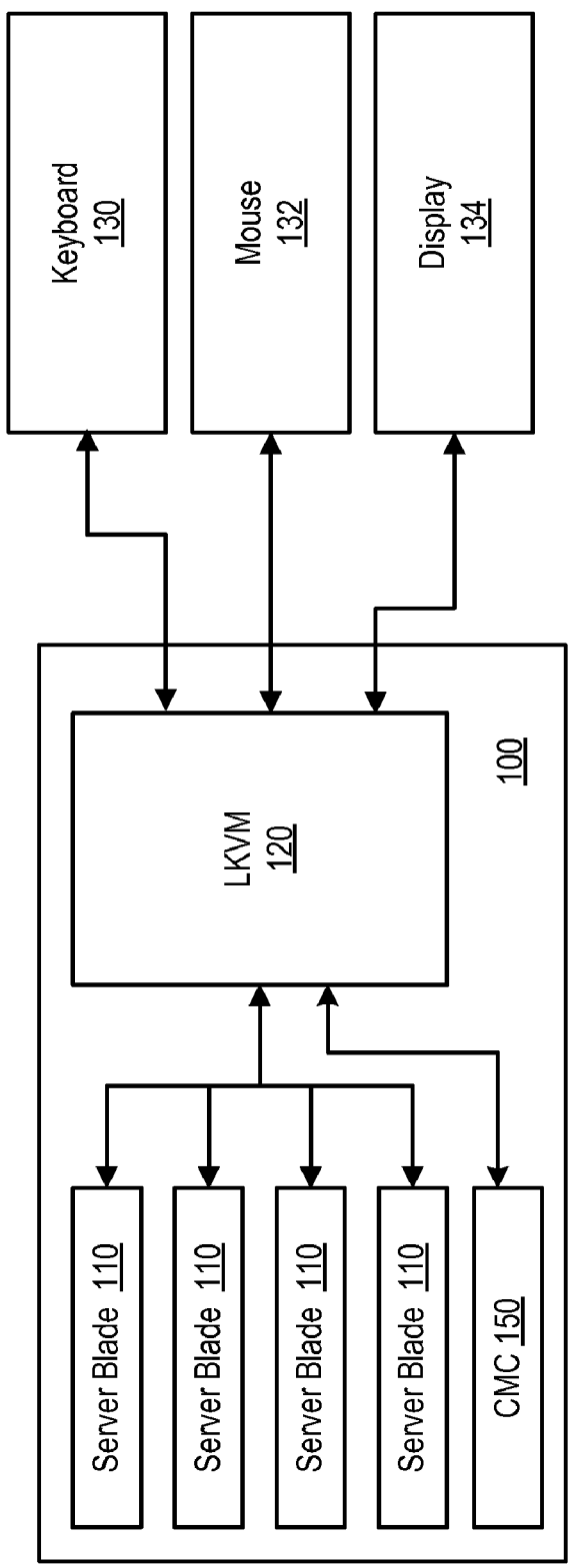
FIG. 1 shows a block diagram of a server blade architecture having a local KVM module.

Referring to FIG. 1, a schematic block diagram of a server blade system 100 is shown. More specifically, within the server blade system 100, multiple server blades 110 are individually coupled to a local KVM module 120. The local KVM module 120 is in turn coupled to a keyboard 130, a mouse 132 and a display 134. The local KVM module 120 is also coupled to a CMC 150.

The local KVM module 120 of the server blade system 100 controls which of the individual blade servers 110 is driving video to the display 134 and is controlled via the keyboard 130 and the mouse 132. The local KVM module 120 of the server blade system 100 can also control whether the CMC 150 drives video to the display 134 and is controlled via the keyboard 130 and mouse 132.

Figure 2B:
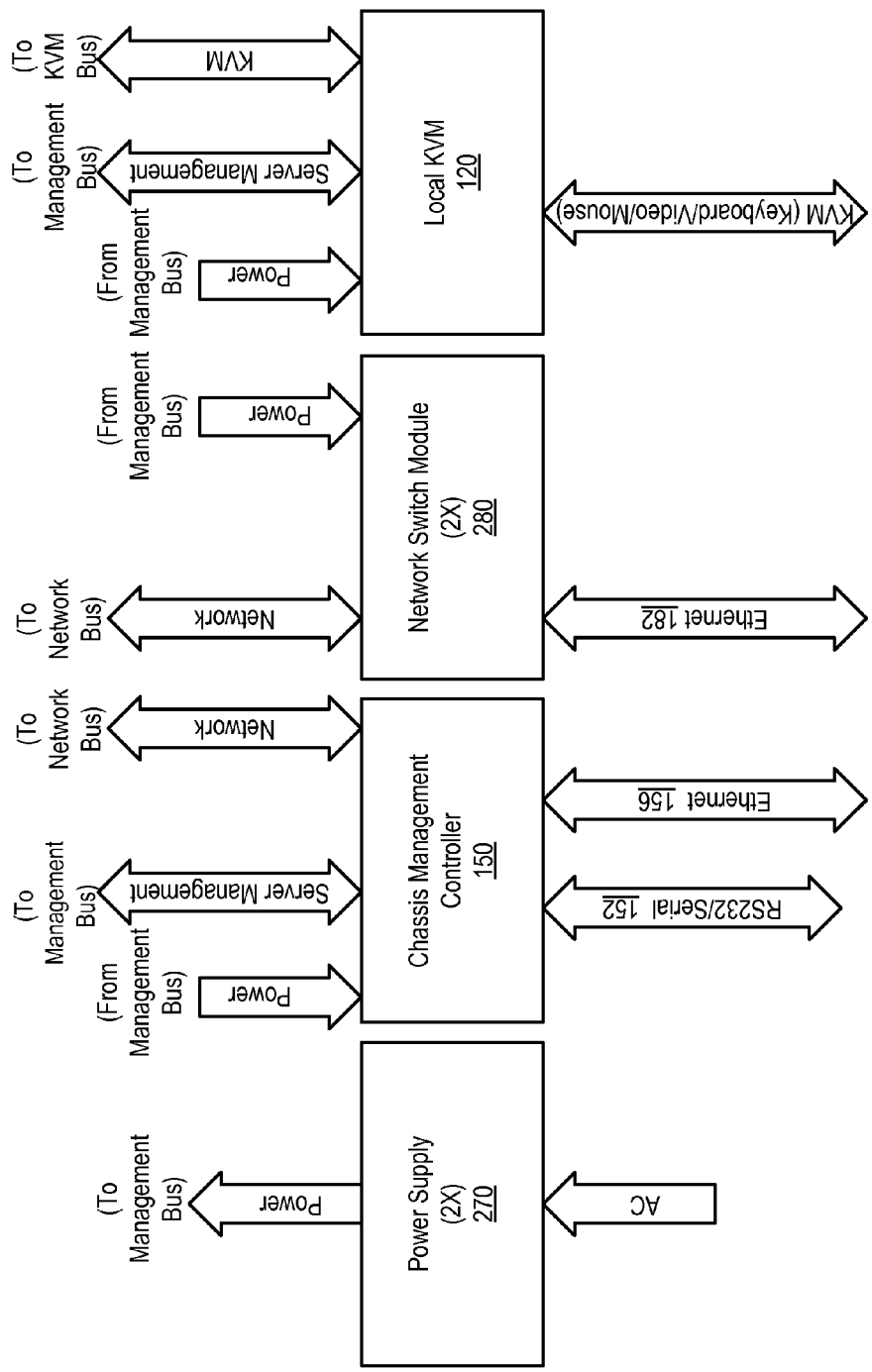

Referring to FIGS. 2A and 2B, a block diagram of a server blade system 100 chassis is shown. Such a system 100 includes a plurality of sub-systems 110a, 110b, 110c and 110d. Each sub-system 110 is an independent information handling system, such as a personal computer or a server blade. These sub-systems usually only include a system board with few external options and generally require a chassis for power and network access. Every sub-system 110 includes respective components, such as a central processing unit (CPU) 212, memory 213, embedded network interface 214, mass storage device 215, and server management interface 216. A keyboard, mouse and monitor is coupled to the system 100 via the local keyboard video mouse module 120 which selectively couples the LKVM module 120 with one of the sub-systems.

Each server blade 110 may also include a respective server blade power management system 220. Each server blade power management system 220 enables a corresponding server blade 110 to be individually and remotely powered on or off. The power management system 220 provides a user with the same effect as a user pushing a mechanical power button located at the front of the server. The functionality of the power management system 120 is compliant with the Microsoft ACPI specification.

The server blades 110 are coupled to a mid-plane 240 which is located within a chassis. The mid-plane 240 includes a network bus 242 (which may be e.g., a chassis private network), a keyboard-video-mouse (KVM) bus 244 and a management bus 246. The mid-plane 240 also delivers power to all devices in the chassis. Each server blade 110 is coupled to the mid-plane 240 via these buses.

The server blade system 100 also includes a chassis management controller (CMC) 150. The CMC 150 is coupled to the mid-plane 240 and more specifically to the network bus 242 and the management bus 246. The CMC 150 also includes a serial port 152, e.g., an RS232 port, a KVM port 154 and an Ethernet port 156.

The server blade chassis 100 also includes a plurality (e.g., two) of power supplies 270 as well as a plurality (e.g., two) of network switch modules 280. The power supplies 270 are coupled to an AC power source and provide power to the server blade system 100 via the management bus 246. The network switch modules 280 are coupled to the network bus 242 and include an Ethernet port 182.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 3:
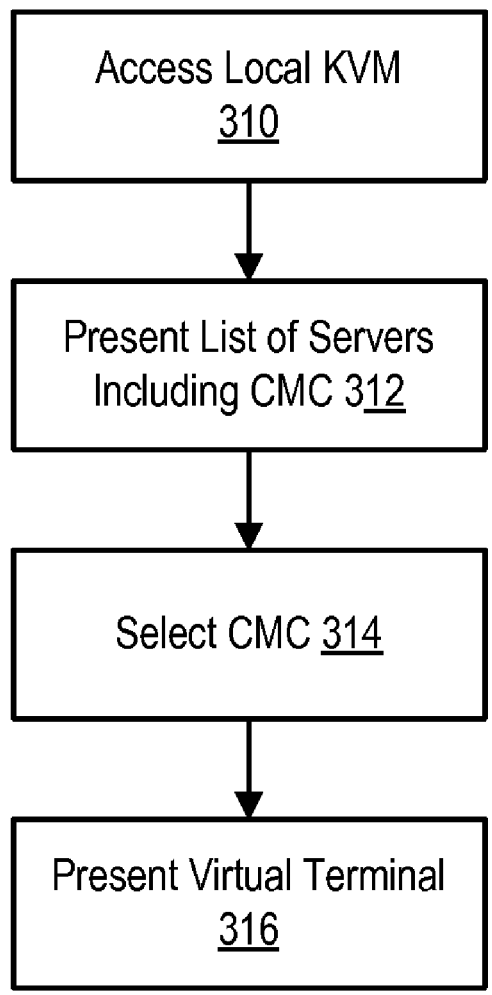
FIG. 3 shows a schematic block diagram of a state machine for a microcontroller of a management module.

Referring to FIG. 3, a schematic block diagram of a state machine for the local KVM module is shown. Among known functions, the local KVM functions as an integrated KVM module for the blade server chassis. When the local KVM module 150 is accessed at step 310, the local KVM module presents among its list of servers an option for selecting a CMC 150 at step 312. When a user selects the access to CMC 150, e.g., by actuating the presented option, at step 314, then the local KVM module 220 presents a virtual terminal for the CMC 150 at step 316, thus providing terminal (e.g., keyboard and video) access to the CMC 150.

Figure 4:
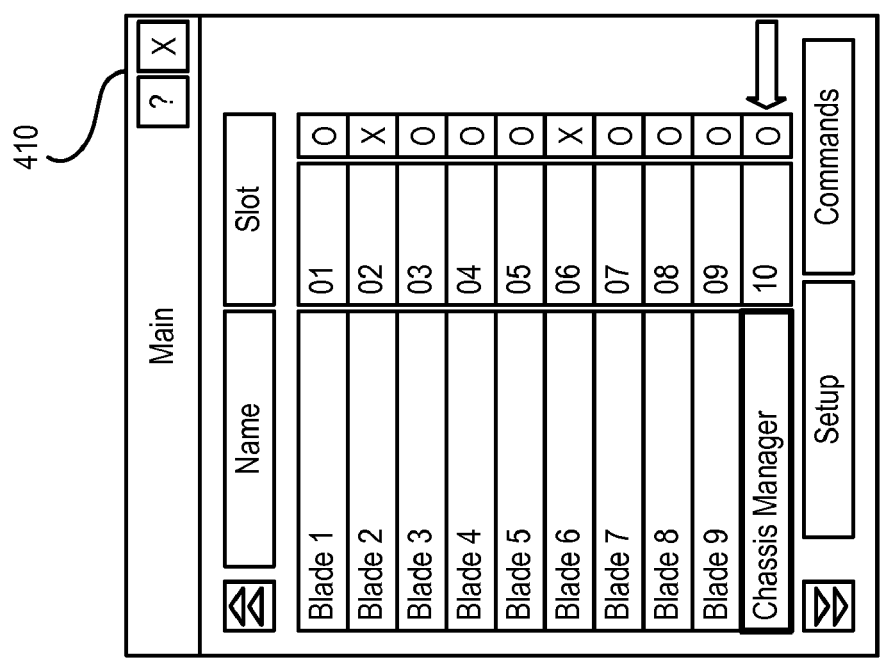
FIG. 4 shows an example presentation of a local KVM screen display.

FIG. 4 shows an example presentation of a local KVM screen display. More specifically, the local KVM screen display 410 presents a list of servers as well as the CMC 150. A server or the CMC may be selected from the list that is presented in the local KVM screen display. When the CMC 150 is selected from the list, then a CMC terminal display is presented.

FIG. 5 shows an example presentation of a terminal display 510. More specifically, when the CMC 150 is selected from the list of servers shown in the local KVM screen display 410, then the virtual terminal presentation 510 is generated. The virtual terminal presentation 420 is thus a CMC client. The virtual terminal with the CMC 150 may be established via a chassis private network, such as the network bus 142 or the management bus 146. The CMC client is presented as a virtual KVM display. In certain embodiments, the virtual terminal for the CMC 150 may be established via a Telnet client.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration and equivalents in form and function as will occur to those ordinarily skilled in the pertinent arts. The depicted and described embodiments are examples only, and are not exhaustive of the scope of the invention.

For example, while four server blades 110 are shown, any number of server blades are contemplated. Also, while a single server chassis 100 is shown, any number of server chassis are contemplated.

Also, it will be appreciated that a CMC module 150 may be any type of processor or computing device.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A system for controlling keyboard video monitor (KVM) functions within a server blade architecture comprising:
   a server blade;
   a management module coupled to the server blade, the management module comprising a chassis management controller, the chassis management controller presenting itself as if the chassis management controller is a server blade; and,
   a local KVM module coupled to the management console, the local KVM module enabling establishment of a virtual terminal with the management module, the local KVM module enabling establishment of the virtual terminal with the chassis management module and a blade management module.

2. The system of claim 1 wherein
   the local KVM module presents a virtual terminal selection presentation; and,
   the virtual terminal selection presentation includes an option for selecting the management module.

3. The system of claim 2 wherein
   when the management module is selected via the virtual terminal selection presentation, the local KVM module establishes a virtual terminal for the management module.

4. The system of claim 3 wherein
   the virtual terminal for the management console provides keyboard and video functions to the management module.

5. The system of claim 3 wherein
   the virtual terminal is established via a serial connection via a local area network (LAN).

6. The system of claim 3 wherein
   the virtual terminal is established via a telnet client via a chassis private network.

7. A server blade system comprising:
   a server blade chassis,
   a server blade coupled to the server blade chassis;
   a management module coupled to the server blade chassis, the management module comprising a chassis management controller, the chassis management controller presenting itself as if the chassis management controller is a server blade; and,
   a local KVM module coupled to the management console, the local KVM module enabling establishment of a virtual terminal with the management module, the local KVM module enabling establishment of the virtual terminal with the chassis management module and a blade management module.

8. The server blade system of claim 7 wherein
   the local KVM module presents a virtual terminal selection presentation; and,
   the virtual terminal selection presentation includes an option for selecting the management module.

9. The server blade system of claim 8 wherein
   when the management module is selected via the virtual terminal selection presentation, the local KVM module establishes a virtual terminal for the management module.

10. The server blade system of claim 9 wherein
    the virtual terminal for the management console provides keyboard and video functions to the management module.

11. The server blade system of claim 9 wherein
    the virtual terminal is established via a serial connection via a local area network (LAN).

12. The server blade system of claim 9 wherein
    the virtual terminal is established via a telnet client via a chassis private network.

* * * * *